United States Patent Office 3,546,146
Patented Dec. 8, 1970

3,546,146
FILMS OF IMPROVED UNIFORMITY AND PROCESSES AND COMPOSITIONS THEREFOR
Max Sockloff, Coral Gables, Fla., and William Singer, Teaneck, N.J., assignors to Troy Chemical Corporation, Newark, N.J., a corporation of New Jersey
No Drawing. Continuation-in-part of application Ser. No. 471,439, July 12, 1965. This application May 5, 1969, Ser. No. 822,016
Int. Cl. C08f *45/34;* C08g *51/34*
U.S. Cl. 260—17
18 Claims

ABSTRACT OF THE DISCLOSURE

Films of improved uniformity, compositions for applying said films to surfaces from non-aqueous systems and processes for producing said films, said compositions being nonaqueous and comprising driable polymeric organic compositions containing a small but effective amount and not more than 0.5% by weight of a polyvinyl ether characterized by having repeating units of the formula

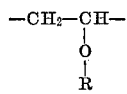

wherein R is a branched hydrocarbon chain; and said polyvinyl ether has a molecular weight of not less than 30,000, processes for applying such nonaqueous compositions and films produced thereby and therefrom.

---

This application is a continuation-in-part application of pending U.S. application Ser. No. 471,439, filed July 12, 1965, now abandoned.

This invention relates to films of improved uniformity, to novel compositions therefor and to processes for same. More particularly, this invention relates to methods of obtaining dry, smooth, uniform protective films comprised of polymeric organic compositions and to novel nonaqueous driable coating compositions, having incorporated therein certain active agents to obtain the satisfactory results of this invention.

Heretofore, protective films of polymeric organic compositions have been applied and produced in a number of ways. For example, the surface or object to be coated has been immersed in the polymeric composition and then removed so as to leave the protective film uniformly distributed on the surface. In practice, however, it has been found that dry, uniform impervious protective film is not produced in that because of the mechanical operation of immersion alone, air is trapped in the film and forms bubbles, and upon curing or drying an imperfect film is formed. In addition, since the curing or drying treatments are uneven, many times wrinkling or "feathering" occurs and leaves the surface irregular. Even further, striations or uneven coloring occurs to provide still more imperfect surfaces.

Another method employed in applying films involves the brushing of the protective compositions onto the surface of the object being coated or treated. This brushing, like the immersion method, usually results in the formation of air holes and uneven application, which are unacceptable when a surface is required to be completely coated by a uniform impervious film. The use of other conventional coating methods such as spraying and flow coating also had the aforementioned disadvantages.

Another factor which tends to reduce the uniformity of films is the use of more than a single pigment in a paint film, the problem being to prevent the separation of one or more of the pigments during the drying process. Such a separation of pigment, for example, in a green color which is obtained by use of a blue pigment and a yellow pigment results in the formation of streaks of blue, yellow, and intermediate shades. Color combinations have always been extremely difficult to handle in coating compositions with respect to obtaining uniform shades throughout the finished film surface. It must be noted, too, that combinations of color pigments in paints are the rule rather than the exception, since shades of various colors are obtained by mixing one or more color pigments with either a white pigment or with each other.

It has now been found that a dry, smooth, film of improved uniformity and comprised of organic polymeric composition can be obtained by immersion, brushing, spraying, flow coating, or any other method desired, by employing the novel nonaqueous, driable compositions of this invention therein. Among the organic polymeric coating compositions which may basically be employed in the practice of this invention to provide the protective film, may be included such substances as alkyd resins, drying oils, alkyd amino resins, polyurethane resins, epoxy resins, nitrocellulose and other cellulosic resins, butadiene polymers and copolymers, styrene polymers and copolymers, chlorinated rubber, polymerized coal tar resins, polyvinyl chloride, acrylic resins, polyesters, and other substituted polyvinyl resins, polyolefin resins such as polyethylene polymers and copolymers. These polymeric compositions may be included in formulations and applied in the form of paints, varnishes, lacquers, resin solutions, polymerizable compositions consisting totally of solids, or other like curable or driable nonaqueous formulations. In addition, there may be included in these formulations such modifiers as pigments, plasticizers, solvents, dyes and other like material without altering the satisfactory results of this invention. As used throughout this specification and in the claims, the term "polymeric compositions" encompasses the polymers themselves as well as polymerizable compositions; and the terms "driable" or "curable" mean the conversion of a liquid polymeric or polymerizable composition to a solid by such means as drying, solvent evaporation, oxidation, baking, polymerization, and the like.

It has also been found that the satisfactory practice of this invention can provide plastic products especially film surfaces which are extremely smooth and bubble-free and have uniform properties, not heretofore contemplated or possible. Plastic objects may be manufactured by a number of methods. One very widely employed method is to place a polymerizable composition in a form or mold, after adding to said composition the catalysts necessary to cause polymerization. The reaction mixture then reacts to form a polymer in the mold in which it was placed. In the present practice of this art, it is very frequently found that the general appearance and surface of the object thus formed is marred by a haze due to air released during the polymerizing reaction. This results from entrapped air, naturally present in the cold polymeric composition, which is released by the heat generated in the formation of the polymer. Also there is found a mottled or cratered surface which is not satisfactory when a uniform, smooth surface is required. It has been found that when the active agent of this invention is incorporated into such polymerizable compositions prior to the polymerization reaction, the product produced is substantially free from the disadvantages of haze formation and surface irregularities, such as craters or mottling, and the surface thereof is smooth and uniform. Equally important, it was found that problems caused by nonuniformity of color were also eliminated.

The novel results of this invention may be obtained by incorporating the novel additive of this invention into the nonaqueous driable polymeric organic compositions contemplated herein. The active additive of this invention is a polyvinyl ether characterized by having repeating units of the formula

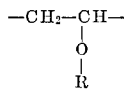

wherein R is a branched hydrocarbon chain, preferably a branched alkyl chain, possessing from three to ten carbon atoms, and preferably from three to eight carbon atoms. The polyvinyl ether which may be employed in the practice of this invention while still obtaining satisfactory results may be of medium to high molecular weight, preferably of about 30,000 to about 1,000,000 or more, and optimally of about 30,000 to about 600,000. It will be further understood that it is possible to employ polyvinyl ether compounds wherein R is a hydrocarbon radical containing an iso group such as isopropyl, isobutyl, isoamyl, etc. The R group may also contain secondary or tertiary carbon atoms. Typical branched polyvinyl ethers employed in the present invention are polyvinyl isobutyl ether, polyvinyl isopropyl ether, polyvinyl isoamyl ether, polyvinyl 2-ethylhexyl ether, polyvinyl secondary butyl ether, polyvinyl tertiary butyl ether, and the like.

It is to be understood, however, that the determination of molecular weights of polymers is difficult at best since the polymers usually contain a wide distribution of molecules of a wide range of molecular weights. It is to be noted, however, that the apparent molecular weight varies widely with the method used in its determination. In the description of this invention, the molecular weights used are those which are supplied by the manufacturer of the particular polyvinyl ether being used. However, the polyvinyl ethers used as additives in accordance with this invention and processes for making them are well known, for example as described in U.S. Pat. Nos. 2,616,879 and 2,799,669 and also described in "Preparative Methods of Polymer Chemistry" by Sorenson and Campbell, published by Interscience Publishers, pp. 194–195 and "Macromolecular Syntheses," published by Wiley, pp. 27–32.

The compositions of this invention may be prepared in any manner known to the art depending upon the end use to which they are put, e.g. paints, clear films and the like. The satisfactory practice of this invention requires that a small but effective amount of the active polyvinyl ether additive be incorporated into the compositions. It has been found that when about 0.00025 percent to about 0.5 percent by weight of the polyvinyl ether is incorporated in the compositions of this invention, satisfactory results are obtained and films of improved uniformity are produced, and preferable results are obtained when the final compositions of this invention have incorporated therein from about 0.0025 percent to about 0.1 percent by weight of the polyvinyl ether agent.

Various of these polyvinyl ethers have in fact been used in the prior art as film-forming components of films, but in the sense that they are considered as film-forming ingredients possessing and imparting certain desirable properties which coincide with the properties of the polyvinyl ethers as, for example, adhesion, flexibility, water insolubility and related properties which are collectively known as toughness. Latices and emulsion paints are notoriously deficient in these properties, polyvinyl acetate in particular being poor in water resistance, and scrubbability. Therefore, the polyvinyl ethers have in the past been incorporated mostly in emulsion or latex- type vehicles, and only in very few instances are there references to incorporation of polyvinyl ethers in nonaqueous systems. The percent to which the polyvinyl ethers is used according to this invention is below the percent range required for its effectiveness as a plasticizer or film-former which was the prior nature of its use. For instance, U.S. Pat. 2,974,114 issued to Steckler uses polyvinyl ether of low-molecular weight not greater than 20,000 to improve the scrubbability resistance of a film consisting of a polyvinyl acetate latex. Thus a polyvinyl ether is used in the Steckler patent as a film component of the finished film in order to improve water resistance and scrubbability.

However, in small quantities of less than 0.5% of the total composition in which they are used in this invention, they no longer function as film-forming material but are used in amounts of the same order of magnitude as the curing catalysts in the compositions which have the effect of causing the film to dry, but do not become a part of the polymer composition itself.

It is furthermore entirely unexpected that materials such as these polyvinyl ethers would exert such striking effects on film-forming compositions. The polyvinyl ethers are used in this invention in such low concentrations that they have no appreciable effect on the physical properties of the film, that is they have no effect in a film on properties such as toughness, adhesion, hardness, gloss, flexibility, water resistance, or scrubbability. This is a desirable characteristic of an additive for the driable polymeric organic coating compositions since the manufacturer of formulations such as paints, varnishes, lacquers and the like does not want to modify or alter in any way the characteristics of the film which he has achieved through careful selection of the vehicle and formulation. Thus it has been discovered that the polyvinyl ethers in very small amounts up to 0.5% exert a profound effect upon the nature of the surface of the film, rendering it free from defects, and in general resulting in formation of a smooth film of uniform surface, free from defects, and in general producing a smooth film of uniform surface, free from wrinkling, striations entrapment of vapor or air bubbles, flow marks, and irregular imperfections caused by the contraction of the film during drying, regardless of how the composition has been applied.

In studies carried out on the effects of using varying percentages of polyvinylisobutyl ether for instance in film forming compositions, it has been found that by using amounts above 2% and up to 20% by weight of, for instance, polyvinylisobutyl ether having a molecular weight of at least 30,000, in various film forming compositions such as and including pigmented alkyd compositions, baking alkyd urea varnishes, poly vinyl chloride lacquers and nitro cellulose lacquers, the viscosity of the film forming compositions was substantially increased over those of the original formulations thereby making application and levelling of the film forming compositions difficult. Furthermore, it was also noted that relatively high levels of 2% to 20% of a polyvinyl ether tended to be incompatible with certain film formers such as polyvinyl chloride as evidenced by loss of gloss in the resulting dried paint films.

The polyvinyl ether additive of this invention can be incorporated into the novel compositions of this invention directly or for convenience it may be preferable or desirable to disperse or dissolve it in a suitable nonaqueous medium or solvent. Examples of suitable solvents which may be employed without altering the results obtained include such solvents as xylene, benzene or kerosene. However, the choice of the method of incorporating the polyvinyl ether agent into the novel compositions of this invention rests with the skilled worker, as this is not critical to the successful operation of the invention.

The following examples are illustrative only of the invention but it is in no way intended to limit the invention to the specific embodiments described.

EXAMPLE 1

A paint having the following composition is prepared:

(1) Pigments: Weight (Gms.)
   (a) Titanium dioxide _____ 200
   (b) Chrome green _____ 50
(2) Vehicle:
   (a) Ester gum modified [1] phenolic resin ____ 11
   (b) Tung oil _____ 172
   (c) Mineral spirits _____ 232
   (d) Pure phenolic resin [2] _____ 100
   (e) Linseed oil _____ 170
(3) 5% Polyvinyl isobutyl ester in solution in xylol (medium mol. wt.-Lutanol J60) [3] _____ 2

[1] The resin obtained by reacting a pure phenolic with the ester obtained by esterifying rosin with a slight stoichiometric excess of glycerol prepared for example as described in Unit 4: Modern Varnish Technology, in the Federation Series on Coatings Technology on pp. 21–24.
[2] A resin prepared by the reaction of a para-substituted phenol with formaldehyde wherein the formaldehyde is used in a slight stoichiometric excess, as for example, para-tertiary butyl phenol reacted as described in Unit 4: Modern Varnish Technology, in the Federation Series in Coatings Technology on pp. 22–24.
[3] Lutanol J60 is a product of Badische Aniline & Soda Fabrik, A. G. having medium molecular weight in the range of 150,000 to 500,000 and having medium viscosity, and made in accordance with the processes described in U.S. Pat. No. 2,616,879 and U.S. Pat. No. 2,799,669. (See also "Vinyl and Related Polymers," by Schildknecht (Wiley and Sons, 1952 Chapter 11).)

The pigments are first ground into a portion of the vehicle which is prepared from a thorough admixture of the ingredients thereof, on a three-roll mill, until a smooth, homogeneous paste is obtained. Into this paste is incorporated the remainder of the vehicle and drying agents, comprising three grams of cobalt naphthenate (6% cobalt) and five grams of lead naphthenate, (24% lead), with agitation to obtain a uniform paint. The polyvinyl ether agent is incorporated into the composition in a xylol solution and also thoroughly admixed therewith.

The viscosity of the blended paint composition is then adjusted to a suitable brushing consistency of 67 to 70 K.U. on the Stormer Viscosimeter, by addition of thinner, as is necessary, as variations of pigments and vehicles change the viscosity of the paint composition.

The paint composition thus obtained is brushed on the smooth surface of a test panel (glass, steel, or paper) and yields a uniform, smooth film surface on drying. The color was uniform throughout the coating.

Similarly, the procedure of Example I may be followed substituting other mixing or grinding apparatus for that hereinabove employed. Thus, a ball mill, pebble mill, high speed disperser or colloid mill may be appropriately employed in place of the three-roll mill, employed above.

The successful practice of the invention in accordance with Example I does not depend upon the method of incorporating the pigments into the paint composition. It is permissible to employ pigments in the form of preground dispersions in linseed oil or any other suitable compatible formulation, as is frequently presently done in the manufacture of paints.

EXAMPLE II

The procedure of Example I is followed but no polyvinyl ether additive is incorporated. Brushing the composition upon an equivalent test surface or panel yields an irregular and pocked surface upon drying, which is also characterized by nonuniformity of color.

EXAMPLE III

The procedure of Example I is followed except that the following ingredients are substituted therefore:

(1) Pigment: Weight (Gms.)
   (a) Chrome green _____ 100
   (b) Titanium dioxide _____ 45
   (c) Calcium sulfate _____ 100

(2) Vehicle: Weight (Gms.)
   (a) Long oil soya alkyd solids (containing 24% phthalic anhydride) [1] _____ 350
   (b) Mineral spirits _____ 235
(3) 5% Polyvinyl isobutyl ether in solution in xylol (Lutanol J60) [2] _____ 1

[1] Product prepared by the condensation of equal molar ratios of glycerol, phthalic anhydride, and soya bean oil fatty acids with the elimination of water and the final resin (350 g.) then dissolved in mineral spirits (235 g.). The preparation being widely available in literature and the materials being a common article of commerce.
[2] As identified in Example I above.

The same satisfactory results obtained in Example I are obtained herein when the resulting paint composition is brushed upon a test surface and allowed to dry. Uniformity of color was also achieved.

EXAMPLE IV

Following the procedure of Example III but omitting the polyvinyl ether agent from the paint composition, upon the drying of the composition brushed on a test surface, a mottled, pocked film is obtained. The color of the film is decidedly nonuniform.

EXAMPLE V

Following the procedure of Example III but substituting an equivalent amount of polyvinyl ethyl ether for the polyvinyl isobutyl ether gives unsatisfactory results on test surfaces including nonuniformity of color such as are obtained in Example IV.

EXAMPLE VI

The procedure of Example I is followed except that the following ingredients are employed:

(1) Pigments: Weight (Gms.)
   (a) Titanium dioxide _____ 245
   (b) Carbon black _____ 5
(2) Vehicle:
   (a) Tall oil long oil alkyd solids (24% phthalic anhydride and 65% oil) [1] _____ 350
   (b) Mineral spirits _____ 235
(3) 5% Polyvinyl isobutyl ether in solution with xylol (high mol. wt.—Oppanol C KV 125) [2] ____ 20

[1] Product prepared by the condensation of equal molar ratios of glycerol, phthalic anhydride, and tall oil fatty acid with the elimination of water to form the complex ester alkyd having 24% phthalic anhydride, the final resin (350 g.) dissolved in mineral spirits (235 g.).
[2] Oppanol C KV125 is a product of Badische Anilin & Soda Fabrik, A.G. having high molecular weight of at least 500,000 and having a high viscosity and made in accordance with the processes in U.S. Pat. No. 2,616,879 and U.S. Pat. No. 2,799,669. (See also "Vinyl and Related Polymers," by Schildkrecht (Wiley and Sons, 1952, chapter 11).

Upon drying a smooth, uniformly colored film is obtained when the resultant composition is brushed on the test surface.

Similar results are obtained if the procedure of Example VI are followed but equivalent amounts of medium-high molecular weight polyvinyl isobutyl ether (Oppanol C KV 115), (Oppanol C KV 115 is a product of Badische Anilin & Soda Fabrik, A. G. having a molecular weight between 200,000 and 500,000.) Polyvinyl isopropyl ether (high mol. wt.) or polyvinyl isooctyl ether (high mol. wt.) are respectively substituted for the polyvinyl isobutyl ether of Example VI.

Furthermore, when the procedure of Example VI is followed but no polyvinyl ether agent is incorporated the dry film resulting from the brushing on of the resultant composition on the test surface is imperfect and defective as well as being nonuniform in color.

EXAMPLE VII

The procedure of Example I is followed, except that the following ingredients are employed:

(1) Pigments: Weight (Gms.)
   (a) Titanium dioxide _____ 50
   (b) Chromium yellow _____ 100
   (c) Chromium orange _____ 100
(2) Vehicle:
   (a) Medium oil soya oil alkyd solids (30% phthalic anhydride and 57% oil)[1] _____ 255
   (b) Mineral spirits _____ 170
   (c) Dehydrated castor oil _____ 80
   (d) Ester gum _____ 80
(3) 5% Polyvinyl isobutyl ether in solution in xylol (medium-high mol. wt.—Oppanol C KV 115)[2] __ 0.5

[1] Product prepared as described in Example III except that the percentage of phthalic anhydride in the final solid product is 30% by weight.
[2] Same as in Example VI.

Upon drying, a smooth, uniformly colored film is obtained when the resultant composition is brushed on the test surface.

Similarly, when the procedure of Example VII is followed and no polyvinyl ether agent is employed, or when equivalent amounts of ethyl or methyl polyvinyl ethers of low or high molecular weight are employed in lieu of the polyvinyl isobutyl ether, the dried film of the resultant composition on the test surface is irregular and unsatisfactory. In addition, the color is nonuniform.

EXAMPLE VIII

The procedure of Example I is followed except that the following ingredients are employed:

(1) Pigments: Weight (Gms.)
   (a) Titanium dioxide _____ 200
   (b) Carbon black _____ 2
   (c) Chrome green _____ 48
(2) Vehicle:
   (a) Tall oil long oil alkyd solids[1] (24% phthalic anhydride and 65% oil) _____ 350
   (b) Mineral spirits _____ 235
(3) 5% polyvinyl isobutyl ether in solution in xylol (medium-high mol. wt. (Oppanol C KV 115)[2] _____ 2

[1] Same as in Example VI.
[2] Same as in Example VI.

This formulation, containing a number of pigments which are particularly susceptible to separation during film formation, ordinarily exhibits marked tendencies towards color irregularities such as floating and flooding and brush-outs show gross nonuniformity of color, when no polyvinyl ether additive is present. Upon addition of the polyvinyl ether and subsequent drying, a smooth, uniformly colored film is obtained when the resultant composition is brushed on the test surfaces.

In other words, when the procedure of Example VIII is followed and no polyvinyl ether is incorporated into the resultant composition or when a polyvinyl ethyl ether is substituted therein, the dried, nonuniformly colored film of the resultant composition on the test surface is irregular and unsatisfactory.

EXAMPLE IX

The procedure of Example I is followed except that the following ingredients are employed:

(1) Pigments: Weight (Gms.)
   (a) Titanium dioxide _____ 240
   (b) Phthalocyanine blue _____ 10
(2) Vehicle:
   (a) Safflower oil modified polyurethane varnish (50% solids in mineral spirits) (Spenkel F–78–50)[1] _____ 585
   (3) 5% Polyvinyl isobutyl ether in solution in xylol (Oppanol C KV 125)[2] _____ 0.5

[1] This vehicle is manufactured by the reaction of tolylene diisocyanate with a safflower oil hydroxyl containing prepolymer so that there is a stoichiometric relation between the number of hydroxyl groups and the number of isocyanate (NCO). The viscosity at 50% is Z–1 to Z–3 (Gardner-Holdt viscosity tubes) and the acid value is below 0.5. Formulations of this nature are discussed in "Paint and Varnish Production Oil Modified Urethane Coatings," October 1962, J. M. Stanton p. 59–et seq.
[2] Same as in Example VI.

Upon drying, a smooth uniform film is obtained when the resultant composition is brushed on the test surface. The color is uniform.

Similar results are obtained when an equivalent amount of polyvinyl isooctyl ether (high mol. wt.) is substituted for the isobutyl polyvinyl ether.

Further, when no polyvinyl ether agent is incorporated into the paint composition of Example X, an irregular and defective film is obtained when the composition is brushed on the test surface and allowed to dry. The color is found to be nonuniform.

EXAMPLE X

The procedure of Example I is followed except that the following ingredients are employed:

(1) Pigments: Weight (Gms.)
   (a) Titanium dioxide _____ 240
   (b) Lampblack _____ 10
(2) Vehicle:
   (a) Tall oil long oil alkyd solids (24% phthalic anhydride and 65% oil)[1] _____ 285
   (b) Modified polyurethane varnish (Spenkel F–78–50)[2] _____ 300
(3) 5% polyvinyl isobutyl ether in solution in xylol (Lutanol J 60)[3] _____ 5

[1] Same as in Example VI and VIII.
[2] Same as in Example IX.
[3] Same as in Example I.

Upon drying, a smooth uniformly colored film is obtained when the resultant composition is brushed on the test surface.

Similarly, when the procedure of Example X is followed and no polyvinyl ether agent is incorporated, an irregular and defective film is obtained when the resultant composition is brushed on the test surface and allowed to dry. The color of the dried film is nonuniform.

EXAMPLE XI

The procedures set forth in Example X are followed except that the following ingredients are employed:

(1) Pigments: Weight (Gms.)
   (a) Chrome green _____ 150
   (b) Titanium dioxide _____ 100
(2) Vehicle:
   (a) Epoxy resin modified with soya bean oil fatty acids—50% solids in mineral spirits (Epi-Tex 120)[1] _____ 585
(3) 5% Polyvinyl isobutyl ether in solution in xylol (Oppanol C KV 115)[2] _____ 3

[1] This vehicle is prepared by heating together dehydrated castor fatty acids with an epoxy prepared by the condensation of equal molar parts of epichlorohydrin and bisphenol using sodium hydroxide as an acid acceptor for the hydrochloric acid liberated in the condensation reaction. The esterification reaction proceeds to a maximum acid number of 3. When the reaction is complete, the product is dissolved in mineral spirits so that the resulting product will contain 50% solids by weight.
[2] Same as in Example VI.

The resultant composition is employed to put a uniform, smooth dry film on the test surface.

EXAMPLE XII

The procedures of Example I are followed except that the following ingredients are employed:

(1) Pigments: Weight (Gms.)
   (a) Phthalocyanine blue _____ 5
   (b) Titanium dioxide _____ 245

(2) Vehicle:

| | Weight (gms.) |
|---|---|
| (a) Epoxy resin (Epotuf 6507–75)[1] | 290 |
| (b) Cellosolve acetate-xylol | 95 |
| (c) Polyamide hardener (Versamid 115)[2] | 200 |
| (3) 5% Polyvinyl isobutyl ether in solution in xylol (Oppanol C KV 115)[3] | 0.5 |

[1] This resin is prepared by the condensation of bisphenol and epichlorohydrin using sodium hydroxide solution as a carrier and as an acid acceptor so that the final product will conform to the following specifications:
Melting point —60–68° C.
Epoxide equivalent (number of grams of resin per grain-mole of epoxdide)—450–525
Esterification Equivalent (number of grams of resin required to esterify one gram-mole of mono basic acid)—130–145
This resin is then dissolved in toluene so that the solids content is 75% and the viscosity is Z–1 to Z–4 (Gardner-Holdt).
[2] This resin is the amide condensation product prepared from the dimer acids which result from the dimerization of $C_{18}$ unsaturated fatty acids and polyamines. The amine constituent is used in excess so that the amine value (mg. of KOH equivalent to base content of 1 g. of resin as determined by HCl) will equal 216 and the viscosity in poises at 75° C. is 35.
[3] Same as in Example VI.

A 15 mil film applied by a doctor blade to test surfaces was uniform in color.

EXAMPLE XIII

To each of the polymerizable organic compositions set forth in Table I below was added 0.05%, 0.5%, and 2.5% of a 5% solution in mineral spirits of polyvinyl isobutyl ether (0.0025%, 0.025%, and 0.125% respectively of additive). The polyvinyl ether was withehld from a second set of polymerizable organic compositions which served as controls. The treated compositions and the controls are shaken thoroughly to insure thorough incorporation of the polyvinyl ether additive and in addition to simulate the agitation encountered with the dip and flow operations used in commercial practice. The resultant compositions are then poured over panels which are held in a vertical position until the dry film forms.

TABLE I

| Composition type | | Thinning solvent |
|---|---|---|
| (A) Oil-modified polyurethane varnish | Vehicle as used in Examples IX and X. | Aliphatic naphtha. |
| (B) Vinyl-toluene alkyd | Vehicle prepared by the futher addition polymerization of a long oil alkyl (described previously) with styrene and containing as a modifier, a small proportion of methyl styrene and using cumene hydroperoxide as the polymerization catalyst. | Do. |
| (C) Baking Alkyd-urea varnish | Vehicle is a blend in the ratio of 7 to 3 of a short oil tall oil fatty acid alkyd containing 41% phthalic anhydride and reduced to 50% solids with xylol and aliphatic naphtha and a urea-formaldehyde prepared by the butanol etherification of the reaction product of urea and formaldehyde. | Toluol. |
| (D) Moisture-curing polyurethane | Vehicle is a solution containing 41-43% solids in xylene-Cellosolve acetate of a polyol and 2,4-tolylene diisocyanate reacted so as to yield a product containing a predominance of isocyanate groups. Such a resin cures by reaction with moisture in the air to form urea linkages which serve to cross-link the film. | Do. |
| (E) Butadiene-styrene resin, with chlorinated paraffin modifiers | Copolymer of styrene and butadiene having a high styrene content with modifier. | Do. |
| (F) Chlorinated rubber resin, with chlorinated paraffin modifier | Vehicle prepared by chlorination of rubber (polyisoprene) until 65% chlorine has been added and double bond unsaturation is eliminated with modifier. | Do. |
| (G) Modified alkyd | The reaction product of tall oil fatty acids, glycerol, phthalic anhydride, and rosin so that the final composition will contain the equivalent of 40% oil and 15% phthalic anhydride. The solids are dissolved in aliphatic naphtha to produce a varnish having 45% solids. | Aliphatic naphtha. |
| (H) Epoxy ester | Reaction of epichlorohydrin bisphenol resin with a less than stoichiometric quantity of fatty acid the resulting product being dissolved in toluol. | Toluol. |
| (I) Dioctyl phthalate plasticized polyvinyl chloride | Resin prepared by polymerization of vinyl chloride with minor quantities of vinyl acetate and the product plasticized with dioctyl phthalate. | Methyl ethyl ketone and toluol. |
| (J) Acrylic resin | Copolymer consisting primarily of methyl acrylate and methyl methacrylate. | Toluol. |
| (K) Nitrocellulose lacquer | Vehicle is prepared by nitration of cellulose so that the final product will contain approximately 11.5% N and such that the viscosity of a 20% solution will be 3-4 seconds Hercules Standard Viscosity Method. The alkyd resin used contains a minimum of 40% phthalic anhydride, and contains coconut fatty acids. | Lacquer solvent blend. |

In addition to the nonpigmented compositions described above, certain of these formulations were pigmented and comparable panels prepared from these compositions with and without polyvinyl ether addititives of this invention. The results of these comparable tests are shown in Table II.

which seemingly form during drying. In contrast, the polyvinyl ether treated composition dried to a level, smooth and uniform disc, distinguished by the absence of surface defects.

As previously described and illustrated, the use of the polyvinyl alkyl ethers in accordance with the present in-

TABLE II

| Corresponding composition from Table I | Pigment or color | Appearance panel with polyvinyl ether additive | Appearance panel without polyvinyl ether additive |
|---|---|---|---|
| (B) Vinyl Toluene alkyd [1] | Gray [2] | Entirely satisfactory | Marked by vertical lines of white and dark gray over lighter gray background. These lines 1/32" apart and vertical indicating direction of flow. |
| (C) Baking alkyd-urea varnish [1] | Green [3] | do | Non-uniform, numerous pock marks or craters and contains white and green lines indicating directional flow of paint as it ran over the panel after pouring. A scanning view of panel shows very considerable "bumpiness" of the film, where the film was disturbed, an underlying darker green color visible. |
| (I) Dioctyl phthalate plasticized polyvinyl chloride [1] | Blue | ([5]) | Very numerous vertical striations indicating direction of paint flow. Striations are 1/16-1/32" apart. In addition, there are many flow marks giving scalloped appearance of curtains known in the paint trade as "curtaining" also numerous craters or pock marks. |
| (K) Nitrocellulose lacquer [1] | Red [4] | Completely uniform film | Vertical striations in upper part of film panel which gradually change to form polygona Benard cells, outline of the cells are marked by more intense red color and a higher gloss gives a very nonuniform appearance. |

[1] Applied by pouring.
[2] Lampblack and white.
[3] Chrome green and white.
[4] Iron oxide pigment.
[5] Completely uniform film surface and color.

The dry films of the control and treated compositions are compared, and in each case the treated compositions possess a much greater degree of uniformity, smoothness and absence of surface defects. The controls display, in varying degrees, irregularities, surface striations, flow lines, holes or craters, patterned stress marks and unruptured bubbles.

EXAMPLE XIV

The procedure of Example XIII is followed, except that the polymerizable composition is a polyester catalyzed with 2% methyl ethyl ketone peroxide and 1% cobalt naphthenate solution (6% cobalt). The polyester is prepared by the condensation of 2 moles of ethylene glycol, 1 mole of phthalic anhydride and 1 mole of maleic anhydride. After condensation is complete as shown by elimination of water and an acid number below 30, the resulting resin is dissolved in styrene so as to yield a 50% solution. One percent of paraffin is added to decrease air inhibition. The resultant polyvinyl ether containing compositions and the controls are cast by pouring the compositions into a lid of a pint paint can to form a disc about three inches in diameter and about one quarter inch thick. The cast control composition upon drying shows a pronounced rippled surface with many large deep holes of from about 1/32 to about 1/16 of an inch diameter. In addition, the edge of the disc is marred by many bubbles vention promotes the uniformity of color as well as improving the surfaces of films prepared from various coating compositions containing this particular additive. The nonuniformity of color which occurs in coatings is known as "floating" in the art. This deleterious characteristic is found where the coating compositions contain more than one pigment or where the colorant employed is actually a blend of pigments. This problem had been previously recognized in the art, and attempts to overcome it involved the use of special silicones. However, the use of such additives had the disadvantage of causing poor adhesion, craters, and imperfect subsequent coatings. The marked advantages achieved by utilizing the branched chain polyvinyl alkyl ethers in the coating compositions are further illustrated by the data in the following Table III wherein 100 gm. aliquots of the basic paint composition of Example I are admixed with 0.2 gm. of 5% xylol solutions of the specified polyvinyl alkyl ethers. The resulting paint compositions are then brushed on a sealed surface.

TABLE III

| | Polyvinyl ether tradename | Molecular weight | Alkyl group | Results |
|---|---|---|---|---|
| Run No.: | | | | |
| 1 | Lutanol J-30 [1] | Low | Isobutyl | Floating; better than control. |
| 2 | Lutanol J-60 [2] | Med | do | No floating. |
| 3 | Oppanol C KV-115 [3] | Med.-High | do | Do. |
| 4 | Oppanol C KV-125 [4] | High | do | Do. |
| 5 | Oppanol A-25 | Low | Ethyl | Marked floating. |
| 6 | Oppanol A-50 | High | do | Do. |
| 7 | Oppanol M-40 | do | Methyl | Do. |
| 8 | Xylol alone (control) | | | Do. |

[1] Low molecular weight of approximately 25,000.
[2] As described in Example I above.
[3] As described in Example VI above.
[4] As described in Example VI above.

The above data clearly shows that the use of polyvinyl ethers having a molecular weight of at least 30,000 results in color uniformity, i.e., the absence of floating. In contrast, when no polyvinyl ether is employed or when the molecular weight of the polyvinvyl ether is too low, a marked lack of color uniformity results. Similar deleterious results were obtained when straight chain polyvinyl ethers were employed.

It will be understood that the medium molecular weight polyvinyl ethers have an average molecular weight of about 30,000 to 200,000; whereas the high molecular weight polyvinyl ether have an average weight of about 500,000 to 600,000. Further, it will be understood that these are broad definitions of average molecular weight ranges, for example, 30,000 to 200,000 would be considered medium, 200,000 to 500,000 would be medium to high and 500,000 is considered high.

EXAMPLE XV

By means of suitable dispersion apparatus, the following components are dispersed:

| Component: | Parts by wt. (g.) |
|---|---|
| Water | 152 |
| Pigment dispersant (sodium salt of a low molecular weight polyacrylic acid 25% solids) | 4.5 |
| Nonionic emulsifier (condensation product of nonyl phenol and 15 moles of ethylene oxide) | 2.0 |
| Diethylene glycol monoethyl ether | 14 |
| Dibutyl phthalate | 14 |
| Ethylene glycol | 14 |
| Titanium dioxide | 92 |
| Calcium carbonate | 185 |
| Calcined clay | 162 |

When these ingredients are well dispersed, there is added:

| Component: | Parts by wt. (g.) |
|---|---|
| Hydroxy ethyl cellulose (as 2% solution in water) | 194 |
| Polyvinyl acetate homopolymer (55% solids) | 157 |
| Water | 143 |
| Phenyl mercuric acetate solution (18% mercury) | 0.3 |

To the above paint composition, a dispersion of phthalocyanine blue pigment in water (10% pigment) is added to obtain a blue color (approximately 10 g. of pigment dispersion).

Films produced from the above composition on test panels by means of brushing were moderately uniform showing slight floating and some pin holes in the surface. Polyvinyl isobutyl ether in amounts of 0.1% and 0.5% were added and had no appreciable effect on the uniformity of the film.

EXAMPLE XVI

Experiments were carried out and test results obtained using the polyvinylisobutyl ether additive of the invention in concentrations of 0.5%, the upper limit of the invention and in amounts of 2%, 10%, and 20% all outside the upper limit of the invention. These tests were made using the ether additive in a variety of coating systems.

The tests show that the additive when used at 0.5% level in the coating compositions, in every case gave good results with no adverse effects in the various coating compositions tested. On the other hand, when the additive was used at the higher levels of 2%, 10%, and 20% in the compositions, the resulting film showed moderate to serious adverse effects including pigment floatation, film defects, impaired solution clarity (turbidity), reduced film gloss as compared with the control, lower hiding power, and relatively slower drying capacity (tackiness) as compared with the control.

The following experimental results and data were obtained by carrying out the hereinafter described tests and evaluations, the results of which are shown in detail in attached Table IV. V, and VI.

In these tests, a more concentrated solution of polyvinyl isobutyl ether in xylol was used (50% by weight). These concentrated were added in six coating systems (A, B, C, D, E, and F) at levels of 1, 4, 20, and 40 percent additions based on total weight. Additions of equivalent levels of xylol were also made in control tests in order to determine the effect of the solid material alone.

That the following coating systems were employed in the tests:

(A) Black nitrocellulose lacquer—Commercial product
(B) Green air-drying alkyd gloss enamel—Commercial product
(C) Clear Alkyl—Melamine baking coating:
    320 lbs. commercial alkyd resin
    80 lbs. melamine formaldehyde resin
    100 lbs. toluol
(D) Gray vinyl coating—Commercial product
(E) Clear epoxy—Amine coating:
    667 lbs. Bis-phenol epichlorohydrin epoxy resin
    167 lbs. methyl, ethyl ketone
    167 lbs. toluol
    30 lbs. triethylene tetramine
(F) Clear vinyltoluene alkyd coating:
    450 lbs. vinyl toluene alkyd resin
    50 lbs. toluol
    1 lb. cobalt naphthenate 6%
    1 lb. methyl ethyl ketoxime The additions shown in the tables were incorporated into 100 gram samples of the above coatings by means of 5 minutes of agitation on a Red Devil Paint Conditioner, the samples were immediately poured onto tin panels, allowed to drain vertically and examined for film defects. Viscosities were measured at 77° F. with a Stormer Stroboscopic Viscosimeter, films were applied to Leneta charts with a 2 mil Bird Applicator and checked for the properties indicated in the Table IV. V. and VI below.

TABLE IV

| Sample No. | Percent addition by weight | | Viscosity, K.U. | Pigment Floating 3 mil | Film defects | Solution clarity, clear coatings | Film gloss vs. control | Film hiding vs. control pigmented | Film dry vs. control |
|---|---|---|---|---|---|---|---|---|---|
| | Polyvinyl isobutyl ether | Xylol | | | | | | | |
| Black Nitrocellulose Lacquer | | | | | | | | | |
| A-1 | 0 | 0 | 53 | | Consid | | | | |
| A-2 | 0.5 | 0.5 | 53 | | None | Equal | Equal | Equal | Equal. |
| A-3 | 2.0 | 2.0 | 55 | | do | Sltly. lower | Sltly. lower | | Do. |
| A-4 | 0 | 2.0 | 53 | | Consid | Equal | Equal | | Do. |
| A-5 | 10.0 | 10.0 | 70 | | None | Cons. lower | Cons. lower | | Mod. tacky. |
| A-6 | 0 | 10.0 | 53 | | Moderate | Equal | | | Equal. |
| A-7 | 20.0 | 20.0 | 86 | | None | Cons. lower | Very low | | Cons. tacky. |
| A-8 | 0 | 20.0 | 53 | | Moderate | Sltly. lower | | | Equal. |
| Green Air Drying Alkyd Enamel | | | | | | | | | |
| B-1 | 0 | 0 | 61 | | Cons | | | | |
| B-2 | 0.5 | 0.5 | 60 | | None | Equal | Equal | Equal | Equal. |
| B-3 | 2.0 | 2.0 | 61 | | do | Sltly. lower | Sltly. lower | | Do. |
| B-4 | 0 | 2.0 | 60 | | Cons | Equal | Equal | | Do. |
| B-5 | 10.0 | 10.0 | 76 | | None | Cons. lower | Cons. lower | | Cons. tacky. |
| B-6 | 0 | 10.0 | 54 | | Cons | Equal | | | Equal. |
| B-7 | 20.0 | 20.0 | 93 | | Moderate | Sltly. lower | Low | | Very tacky. |
| B-8 | 0 | 20.0 | 53 | | Cons | Equal | | | Equal. |

TABLE V

| Sample No. | Percent addition by weight - Polyvinyl isobutyl ether | Percent addition by weight - Xylol | Viscosity, K.U. | Pigment floating 3 mil | Film defects | Solution clarity, clear coatings | Film gloss vs. control | Film hiding vs. control, pigmented | Film dry vs. control |
|---|---|---|---|---|---|---|---|---|---|
| Clear Alkyd-Melamine Varnish | | | | | | | | | |
| C-1 | 0 | 0 | 60 | Cons | Good | | | | |
| C-2 | 0.5 | 0.5 | 54 | V. slight | V. slight haze | Equal | | Equal. |
| C-3 | 2.0 | 2.0 | 67 | None | Cons. turbid | Sltly. lower | | Do. |
| C-4 | 0 | 2.0 | 58 | Cons | Good | Equal | | Do. |
| C-5 | 10.0 | 10.0 | 93 | None | Very turbid | Cons. lower | | Do. |
| C-6 | 0 | 10.0 | 53 | Moderate | Good | Equal | | Do. |
| C-7 | 20.0 | 20.0 | 120 | None | Very turbid | Cons. lower | | Cons. tacky. |
| C-8 | 0 | 20.0 | 53 | Moderate | Good | Equal | | Equal. |
| Gray Vinyl Coating | | | | | | | | | |
| D-1 | 0 | 0 | 67 | Slight | | | | | |
| D-2 | 0.5 | 0.5 | 64 | None | | Equal | Equal | Equal. |
| D-3 | 2.0 | 2.0 | 70 | do | | Sltly. lower | Sltly. lower | Do. |
| D-4 | 0 | 2.0 | 61 | Slight | | Equal | Equal | Do. |
| D-5 | 10.0 | 10.0 | 89 | None | | Sltly. higher | Cons. lower | Cons. tacky. |
| D-6 | 0 | 10.0 | 55 | do | | Equal | Equal | Equal. |
| D-7 | 20.0 | 20.0 | 106 | do | | Sltly. higher | Very low | Very tacky. |
| D-8 | 0 | 20.0 | 53 | do | | Equal | Equal | Equal. |

TABLE VI

| Sample No. | Percent addition by weight - Polyvinyl isobutyl ether | Percent addition by weight - Xylol | Viscosity, K.U. | Film defects | Solution clarity | Film clarity | Film gloss vs. control | Film dry vs. control |
|---|---|---|---|---|---|---|---|---|
| Clear Epoxy-Amine Varnish | | | | | | | | |
| E-1 | 0 | 0 | 53 | Moderate | Good | Good | | Equal. |
| E-2 | 0.5 | 0.5 | 53 | Slight | V. slt. turbid | do | Equal | Slightly tacky. |
| E-3 | 2.0 | 2.0 | 53 | do | Sltly. turbid | Slt. haze | do | Equal. |
| E-4 | 0 | 2.0 | 53 | do | Good | Good | do | Equal. |
| E-5 | 10.0 | 10.0 | 55 | Moderate | Cons. turbid | Cons. haze | Mod. lower | Cons. tacky. |
| E-6 | 0 | 10.0 | 53 | None | Good | Good | Equal | Equal. |
| E-7 | 20.0 | 20.0 | 69 | Moderate | Cons. turbid | Cons. haze | Cons. low | Cons. tacky. |
| E-8 | 0 | 20.0 | 53 | None | Good | Good | Equal | Equal. |
| Clear Vinyltoluene Alkyd Varnish | | | | | | | | |
| F-1 | 0 | 0 | 74 | Cons | Good | Good | | Equal. |
| F-2 | 0.5 | 0.5 | 75 | None | V. slt. turbid | do | Equal | Do. |
| F-3 | 2.0 | 2.0 | 82 | do | Sltly. turbid | Slt. haze | do | Do. |
| F-4 | 0 | 2.0 | 70 | Moderate | Good | Good | do | |
| F-5 | 10.0 | 10.0 | 94 | None | Cons. turbid | Cons. haze | Mod. lower | Slightly tacky. |
| F-6 | 0 | 10.0 | 55 | do | Good | Good | Equal | Equal. |
| F-7 | 20.0 | 20.0 | 106 | do | Cons. turbid | Cons. haze | Cons. low | Cons. tacky. |
| F-8 | 0 | 20.0 | 53 | do | Good | Good | Equal | Equal. |

A number of adverse effects were noted as a result of relatively high levels of additions to the coatings, as follows:

Viscosity increase—All six coatings
Solution clarity—Considerable turbidity in all three clear coatings tested
Film clarity—Considerable turbidity in all three clear coatings
Film gloss—Lowered at one or more levels in all six coatings
Hiding—Considerable loss of hiding at higher levels in two of the three pigmented coatings
Drying—Drying noticeably impaired in all six coatings at high levels of A50.

These tests and the data tabulated in Tables IV, V, and VI clearly demonstrate that the use of greater than 0.5% by weight of the polyvinyl ether additive in coating compositions is deleterious and produces adverse results.

From the foregoing it will be understood that the embodiments of the present invention described above are well suited to provide the advantages set forth, and since many possible embodiments may be made of the various features of this invention and as the invention herein described may be varied in various parts, all without departing from the scope of the invention, it is to be understood that all matter hereinbefore set forth is to be interpreted as illustrative and that in certain instances some of the features of the invention may be used without a corresponding use of other features, all without departing from the scope of the invention.

What is claimed is:
1. A method of obtaining films having a minimum number of surface defects detracting from a uniform appearance which comprises applying to a surface a non-aqueous composition comprising a driable polymeric organic composition having incorporated therein a small but effective amount but not more than 0.5% by weight of a polyvinyl ether characterized by having repeating units of the formula

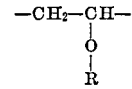

wherein R is a branched hydrocarbon chain; and said polyvinyl ether has a molecular weight of not less than 30,000; and thereafter subjecting the composition to drying to produce a uniform film.

2. The method of claim 1 wherein said polymeric organic composition is a polyurethane resin.
3. The method of claim 1 wherein said polymeric organic composition is a polyester resin.
4. The method of claim 1 wherein said polymeric organic composition is an alkyd resin.
5. The method of claim 1 wherein said polymeric organic composition is a butadiene-styrene resin.
6. The method of claim 1 wherein said polymeric organic composition is a cellulosic resin.
7. The method of claim 1 wherein said polyvinyl ether is polyvinyl branched chain alkyl ether, wherein said alkyl group contains from 3 to 10 carbon atoms.

8. The method of claim 7 wherein said polyvinyl branched chain alkyl ether is polyvinyl isobutyl ether.

9. The method of claim 7 wherein said polyvinyl branched chain alkyl ether is polyvinyl isopropyl ether.

10. The method of claim 7 wherein said polyvinyl branched chain alkyl ether is polyvinyl isooctyl ether.

11. A uniform film produced by the method of claim 1.

12. A nonaqueous composition especially adapted for imparting a dry, uniform protective film to a surface which comprises a driable polymeric organic resin having incorporated therein a small but effective amount but not more than 0.5% by weight of a polyvinyl ether characterized by possessing repeating units of the formula

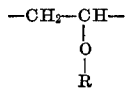

wherein R is a branched hydrocarbon chain, and said polyvinyl ether has a molecular weight of not less than 30,000.

13. The composition of claim 12 wherein said polymeric organic composition is a polyurethane resin.

14. The composition of claim 12 wherein said polymeric organic resin is a polyester resin.

15. The composition of claim 12 wherein said polymeric organic resin is an alkyd resin.

16. The composition of claim 12 wherein said polymeric organic resin is a butadiene-styrene resin.

17. The composition of claim 12 wherein the amount of polyvinyl ether is within the range of 0.0025 to 0.1% by weight.

18. The composition of claim 12 wherein said polyvinyl ether is polyvinyl isobutyl ether.

References Cited
UNITED STATES PATENTS

| | | | |
|---|---|---|---|
| 2,616,879 | 11/1952 | Zoss | 260—33.2 |
| 2,799,669 | 7/1957 | Zoss | 260—33.2 |
| 2,974,114 | 3/1961 | Steckler et al. | 260—29.6 |

DONALD E. CZAJA, Primary Examiner

R. W. GRIFFIN, Assistant Examiner

U.S. Cl. X.R.

117—161, 162, 166, 167; 260—18, 19, 22, 33.2, 33.6, 37, 38, 40, 41, 41.5, 844, 858, 862, 880